Patented Mar. 18, 1930

1,750,720

UNITED STATES PATENT OFFICE

JEAN MATTI, OF PULLY, SWITZERLAND, ASSIGNOR TO AUGMENTINE HOLDING S. A., OF LAUSANNE, ROQUEBRUNE, SWITZERLAND

PROCESS FOR THE MANUFACTURE OF BREAD

No Drawing. Application filed April 5, 1928, Serial No. 267,803, and in Germany April 21, 1927.

This invention relates to a process for the manufacture of bread and has for its object to obtain a better quality and a higher yield of bread from the same quantity of flour as used in the ordinary process of manufacture.

It has previously been proposed in connection with the manufacture of bread to mix the flour with baking-powder, glycerine, Provençal oil and alcohol and to add together 20–30 drams of these ingredients to one pound of flour, i.e. to mix the flour with 5–7% of these ingredients. In such processes the addition of glycerine has for its object to hold the new bread fresh for several days.

The present invention, however, comprises a process for making bread wherein the dough is mixed during its preparation with a relatively small quantity of an emulsion consisting of an edible neutral fatty substance, glycerine and water. The addition of this emulsion takes place during the preparation of the dough from the flour.

Contrarily to the above-mentioned known process in which the addition of glycerine, oil and alcohol takes place separately, it is essential for the present invention that the emulsion of neutral fat, glycerine and water be added to the dough in a mixed state during its preparation. It has been ascertained that paraffin oil is an especially useful fat for carrying out my improved process. This paraffin oil is still liquid at the normal temperature of the baking-room, but it passes into semi-liquid state at a slight decrease of the temperature.

Otherwise the manufacture of the bread itself is done in accordance with the usual process and takes about the same length of time.

*Example for execution*

100 parts of flour are intimately mixed in the well known manner with 66.5 parts of water, 2 parts of salt and 1 part of yeast. In order to prevent the dough from parching during the baking-process an addition of 0.3 parts of an emulsion is made to it during its preparation, this emulsion consisting of 55% paraffin oil, 35% glycerine and 10% water. These ingredients are so intimately mixed with each other that they form a mass as uniform as possible. If the mixture has been produced some time before its use, it is preferable to shake the mass well before beginning the baking-process. The preparation of the dough takes place in the usual manner at a temperature of from 38 to 40 degrees C. (100 to 102 degrees F.).

The addition of the emulsion to the dough has the effect that an excessive evaporation of the water is prevented and that in consequence thereof a higher yield of 4 to 5% is obtained than by the ordinary process of manufacture. Considering that the bread is an article of food which is consumed in the greatest quantities, and considering further that the bread produced by the novel process of manufacture also possesses a greater possibility of exploitation this higher yield of 4 to 5% obtained by a relatively small addition of emulsion must be deemed as a considerable technical progress. The dough produced with the addition of the emulsion is manually or mechanically kneaded for about 12 to 15 minutes at a temperature of about 38 degrees C. (100 degrees F.) and it is thereupon allowed to stand 10 to 15 minutes in order that the gluten and other albumins may be dissolved. Finally the dough is moulded. Before it is placed in the oven it is to be quickly cooled.

Having now described my invention, what I claim as new and desired to secure by Letters Patent, is:

1. In a process for the manufacture of bread, wherein the preparation of the dough takes place in the usual manner by mixing flour, water, salt and yeast, the improvement which consists in adding an emulsion of paraffin oil, glycerine and water to the dough during its preparation.

2. In a process for the manufacture of bread, wherein the preparation of the dough takes place in the usual manner by mixing flour, water, salt and yeast, the improvement which consists in adding 0.3 parts of an emulsion of paraffin oil, glycerine and water to 100 parts of flour, 66.5 parts of water, 2 parts of salt and 1 part of yeast during the preparation of the dough.

3. In a process for the manufacture of bread, wherein the preparation of the dough takes place in the usual manner by mixing flour, water, salt and yeast, the improvement which consists in adding 0.3 parts of an emulsion consisting of 55% paraffin oil, 35% glycerine and 10% water, to 100 parts of flour, 66.5 parts of water, 2 parts of salt and 1 part of yeast during the preparation of the dough.

In testimony whereof I have signed my name to this specification.

JEAN MATTI.